United States Patent [19]
Maeda et al.

[11] Patent Number: 5,349,671
[45] Date of Patent: Sep. 20, 1994

[54] MICROPROCESSOR SYSTEM GENERATING INSTRUCTION FETCH ADDRESSES AT HIGH SPEED

[75] Inventors: Toshinori Maeda; Tomoharu Kawada; Jiro Miyake, all of Osaka, Japan

[73] Assignee: Matsushita Electric Industrial Co., Ltd., Osaka, Japan

[21] Appl. No.: 494,368

[22] Filed: Mar. 16, 1990

[30] Foreign Application Priority Data

Mar. 23, 1989 [JP] Japan .................. 1-70813

[51] Int. Cl.⁵ .................. G06F 9/32; G06F 9/38
[52] U.S. Cl. .................. 395/800; 395/375; 364/DIG. 1; 364/261.3; 364/261.5; 364/DIG. 2; 364/938; 364/938.1
[58] Field of Search .................. 395/800, 375

[56] References Cited
U.S. PATENT DOCUMENTS

| | | | |
|---|---|---|---|
| 4,435,756 | 12/1981 | Potash | 395/375 |
| 4,853,840 | 8/1989 | Shibuya | 395/375 |
| 4,914,579 | 4/1990 | Patrino et al. | 395/375 |

OTHER PUBLICATIONS

Miyake et al; "A 40 MIPS (Peak) 64-bit Microprocessor with One-Clock Physical Cache Load/Store"; IEEE Feb. 14, 1990.

*Primary Examiner*—Alyssa H. Bowler
*Assistant Examiner*—L. Donaghue
*Attorney, Agent, or Firm*—Lowe, Price, LeBlanc & Becker

[57] ABSTRACT

A microprocessor system which comprises an arithmetic logic unit for generating flags, a flag update detector for outputting a flag update detecting signal, a status register coupled to the flag update detector and the arithmetic logic unit for receiving the flag update detecting signal and a flag outputted from the arithmetic logic unit, a first address outputting portion coupled to the flag update detector and the status register for receiving the flag update detecting signal, a flag outputted from the status register, a target instruction address, a next instruction address and a branch condition for determining according to the flag received from the status register whether or not the branch condition is met, and for outputting first and second address candidates selected from the target instruction address and the next instruction address according to the flag update signal and to whether or not the branch condition is met, and a second address outputting portion coupled to the first address outputting portion and the arithmetic logic unit for receiving the first and second address candidates outputted from the first address outputting portion, the branch condition and the flag outputted from the arithmetic logic unit, for determining according to the flag received from the arithmetic logic unit whether or not the branch condition is met, and for outputting the target instruction address or the next instruction address as an instruction fetch address on the basis of a result of determining according to the flag received from the arithmetic logic unit whether or not the branch condition is met.

8 Claims, 9 Drawing Sheets

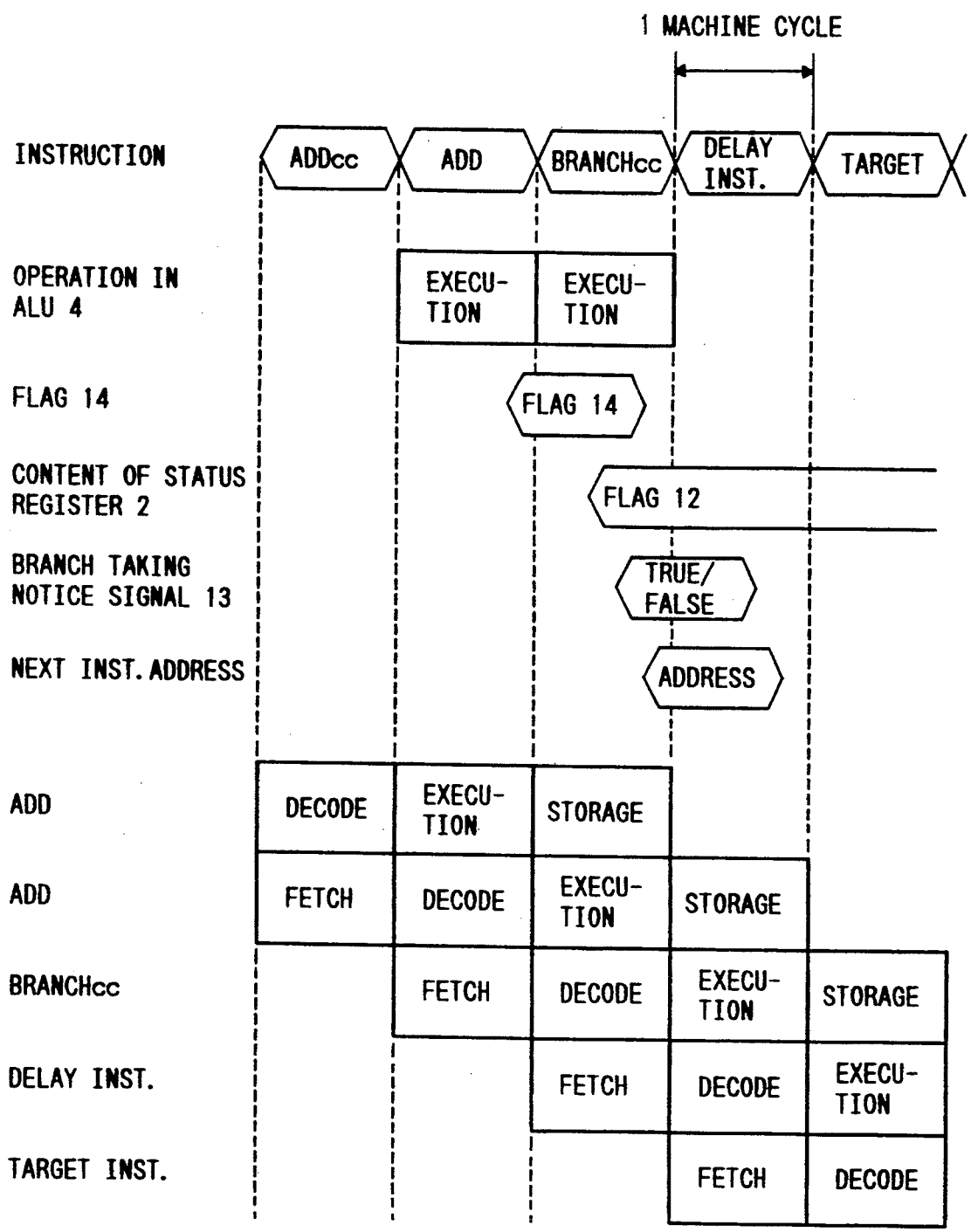

FIG. 3

| INPUT CONDITION | | | OUTPUT SIGNAL | | |
|---|---|---|---|---|---|
| FLAG UPDATE DETECTING SIGNAL 11 | BRANCH TAKING NOTICE SIGNAL 13a | BRANCH TAKING NOTICE SIGNAL 13b | 1ST ADDRESS CANDIDATE 18 | 2ND ADDRESS CANDIDATE 19 | INSTRUCTION FETCH ADDRESS 20 |
| 0 | 0 | DON'T CARE | NEXT INSTRUCTION ADDRESS 17 | NEXT INSTRUCTION ADDRESS 17 | NEXT INSTRUCTION ADDRESS 17 |
| 0 | 1 | DON'T CARE | TARGET INSTRUCTION ADDRESS 16 | TARGET INSTRUCTION ADDRESS 16 | TARGET INSTRUCTION ADDRESS 16 |
| 1 | DON'T CARE | 0 | TARGET INSTRUCTION ADDRESS 16 | NEXT INSTRUCTION ADDRESS 17 | NEXT INSTRUCTION ADDRESS 17 |
| 1 | DON'T CARE | 1 | TARGET INSTRUCTION ADDRESS 16 | NEXT INSTRUCTION ADDRESS 17 | TARGET INSTRUCTION ADDRESS 16 |

FIG. 5

| BRANCH CONDITION NO. 15 | BRANCH CONDITION | PREDICATE EVALUATION BY CONVENTIONAL SYSTEM | PREDICATE EVALUATION BY INSTANT INVENTION |
|---|---|---|---|
| 0 | always | 1 | 1 |
| 1 | never | 0 | 0 |
| 2 | not equal | notZ | notZ |
| 3 | equal | Z | Z |
| 4 | greater | not(Z or (N xor V)) | not(Z or X) |
| 5 | less or equal | Z or (N xor V) | Z or X |
| 6 | greater or equal | not(N xor V) | notX |
| 7 | less | N xor V | X |
| 8 | greater unsigned | not(C or Z) | not(C or Z) |
| 9 | less or equal unsigned | C or Z | C or Z |
| 10 | carry clear | notC | notC |
| 11 | carry set | C | C |
| 12 | positive | notN | notN |
| 13 | negative | N | N |
| 14 | overflow clear | notV | notV |
| 15 | overflow set | V | V |

$X = (a + \underline{b}) \cdot r + a \cdot \underline{b} \cdot \overline{r}$ (IN CASE OF ADDITION)
$X = (a + \underline{b}) \cdot r + a \cdot \underline{b} \cdot r$ (IN CASE OF SUBTRACTION)

MICROPROCESSOR SYSTEM GENERATING INSTRUCTION FETCH ADDRESSES AT HIGH SPEED

BACKGROUND OF THE INVENTION

1. Field of the Invention

This invention generally relates to a microprocessor system for generating instruction addresses therein and more particularly to a microprocessor system which can generate instruction addresses therein at a high speed.

2. Description of the Related Art

Referring first to FIG. 7, there is schematically shown a part, which is most directly related to the generation of an instruction address during the execution of a branch instruction, of a branch instruction processing portion of a conventional microprocessor system.

An arithmetic logic unit (ALU) 4 for generating flags generates a flag 14, the contents of which comprise four composing flags, that is, a carry flag, a zero flag, a negative flag and an overflow flag, and then outputs the flag 14 to a status register 2. Further, the status register 2 is controlled by a flag update detecting signal 11 outputted from a flag update detector 1 and stores the contents of the contents of the flag 14 when an arithmetic or logical operation instruction for updating a flag is executed. A predicate evaluation circuit 3 determines whether or not a branch is taken, based on both of a flag 12 outputted by the status register 2 and a branch condition 15 which is the contents of a branch condition field 10a of an instruction 10. Further, the predicate evaluation circuit 3 outputs a branch taking notice signal 13 indicating the result of the determination to an address selecting circuit 5 whereupon a target instruction address 16 and a next instruction address 17 are selected. Then, the address selecting circuit 5 outputs one of these addresses as an instruction fetch address 20.

Turning now to FIG. 9, there is shown another known conventional system for generating an instruction address. This conventional system determines whether or not a branch is taken, based on the flag 14 outputted from the ALU 4 in case where an instruction immediately prior to a conditional branch instruction updates the flag and on the other hand based on the flag 12 outputted from the status register 2, which stores a flag reflecting the result of the last executed operation instruction updating the flag, in case where an instruction immediately prior to a conditional branch instruction does not update the flag. Then, this conventional system determines an instruction address in accordance with the result of the determination. In this conventional system, a flag update detector 1 determines whether or not the flag is to be updated. Further, in accordance with a flag update detecting signal outputted from the flag updating detector 1, a flag selecting circuit 7 chooses one of the flag 12 outputted from the status register 2 and the flag 14 outputted from the ALU 4 and outputs the chosen flag 12 or 14 to the predicate evaluation circuit 3. This predicate evaluation circuit 3 receives the flag chosen by the flag selecting circuit 7 and a branch condition 15 which is the content of a branch condition field 10a of an instruction 10 as inputs thereto and then determines whether or not a branch is taken. Further, the predicate evaluation circuit 3 notifies the address selecting circuit 5 of the result of the determination by using a branch taking notice signal 13.

The address selecting circuit 5 then selects a target instruction address 16 and a next instruction address 17 and further outputs an instruction fetch address 20.

However, in the conventional system of FIG. 7, when a program is executed in the order of, for example, an arithmetic or logical operation instruction, a conditional branch instruction, a delay instruction and a target instruction, in case where an operation instruction directly prior to a conditional branch instruction updates a flag as ADDcc (i.e. ADD and modify condition code) does in pipeline processing comprising four stages (namely, an instruction fetching stage, an instruction decoding stage, an instruction executing stage and an execution result storing stage as shown in FIG. 8), the flag 14, which reflects the result of the arithmetic or logical operation and is used for determining whether or not a branch is taken, is not stored in the status register 2 in a stage of determining whether or not a branch condition of a branch instruction is met (i.e. the instruction decoding stage for decoding a conditional branch instruction). This is because the flag 14 reflecting the result of the arithmetic operation is written into the status register 2 in the execution result storing stage. Further, this results in that the performing of the instruction decoding stage of decoding the conditional branch instruction is put off for one machine cycle until the execution result storing stage for storing the result of the execution of the operation instruction updating the flag is performed. Thus, 2 machine cycles all told are necessary for executing a conditional branch instruction. This is called "register interlock" and causes a disturbance in the pipeline and thus becomes an important factor of deterioration of performance of the microprocessor system.

On the other hand, in the conventional system of FIG. 9, a rate-determining path up to the output of the instruction fetch address 20 generates the flag 14 reflecting the result of the arithmetic or logical operation by using the ALU 4 and determines whether or not a branch is taken, based on the flag 14, and further selects the target instruction address 16 and the next instruction address 17 in accordance with the branch taking notice signal 13 and finally outputs the instruction fetch address 20. Furthermore, in this conventional system, it is necessary to choose one of the flag 12 outputted from the status register 2 and the flag 14 outputted from the ALU 4 in the flag selecting circuit 7. Therefore, this conventional system has a drawback that the generation of the branch taking notice signal 13 is delayed by connecting the flag selecting circuit 7 to the rate-determining path in series and thus the choice of the target instruction address 16 and the next instruction address 17 cannot be performed at a high speed.

Additionally, though each of the above described conventional systems has a single predicate evaluation circuit and thus the circuit of each of the above described conventional systems has a simple structure, it is very difficult for the conventional systems to realize high speed generation of flags and high speed predicate evaluation. As a case in which a rate-determining stage of the predicate evaluation processing is time-consuming, can be cited the processing in the case that the branch condition is "greater", "greater or equal", "less or equal" or "less". Namely, in such cases, an exclusive-OR of the negative flag and the overflow flag is generated and thus the number of processing stages is larger than that of the processing stage in case of the other branch conditions in which the processing can be performed by using a single-stage gate corresponding to NOT (logical negation), OR (logical sum) and so on. Further, in such cases, by using the exclusive-OR of the negative and overflow flags, it is determined whether or not a branch is taken, and therefore the branch taking notice signal 13 is delayed. Thus, the conventional systems above described have a drawback that it is difficult to perform the choice of the target instruction address 16 and the next instruction address 17 at a high speed.

The present invention is accomplished to eliminate the drawbacks of the conventional systems.

It is accordingly an object of the present invention to provide a microprocessor system which can output a instruction fetch address at a high speed.

SUMMARY OF THE INVENTION

To achieve the foregoing object and in accordance with the present invention, there is provided a microprocessor system which comprises an arithmetic logic unit for generating flags, a flag update detector for outputting a flag update detecting signal, a status register coupled to the flag update detector and the arithmetic logic unit for receiving the flag update detecting signal and a flag outputting from the arithmetic logic unit, a first address outputting portion coupled to the flag update detector and the status register for receiving the flag update detecting signal, a flag outputted from the status register, a target instruction address, a next instruction address and a branch condition of a conditional branch instruction, for determining according to the flag received from the status register whether or not the branch condition is met, and for outputting first and second address candidates selected from the target instruction address and the next instruction address according to the flag update signal and to whether or not the branch condition is met, and a second address outputting portion coupled to the first address outputting portion and the arithmetic logic unit for receiving the first and second address candidates outputted from the first address outputting portion, the branch condition of the conditional branch instruction and the flag outputted from the arithmetic logic unit, for determining according to the flag received from the arithmetic logic unit whether or not the branch condition is met, and for outputting the target instruction address or the next instruction address as an instruction fetch address on the basis of a result of determining according to the flag received from the arithmetic logic unit whether or not the branch condition is met.

Thereby, can be omitted the flag selecting circuit which selects the flag outputted from the status register and the flag outputted from the ALU in accordance with the flag update detecting signal. Thus, the flag outputted from the ALU can be directly inputted to the second address outputting portion. Consequently, the microprocessor system of the present invention can output an instruction fetch address at a high speed.

BRIEF DESCRIPTION OF THE DRAWINGS

Other features, objects and advantages of the present invention will become apparent from the following description of a preferred embodiment with reference to the drawings in which like reference characters designate like or corresponding parts throughout all views, and in which:

FIG. 2 is a timing chart for showing the relation among the timing of various processing in the first embodiment of the present invention when a branch instruction is executed;

FIG. 3 is a diagram for illustrating an operation of an address selecting circuit of the microprocessor system of the present invention;

FIG. 5 is a diagram for illustrating branch conditions in case of the second embodiment of the present invention and corresponding expressions used for determining whether or not a branch is taken;

DETAILED DESCRIPTION OF PREFERRED EMBODIMENTS

Hereinafter, preferred embodiments of the present invention will be described in detail by referring to the accompanying drawings.

Figure 1:
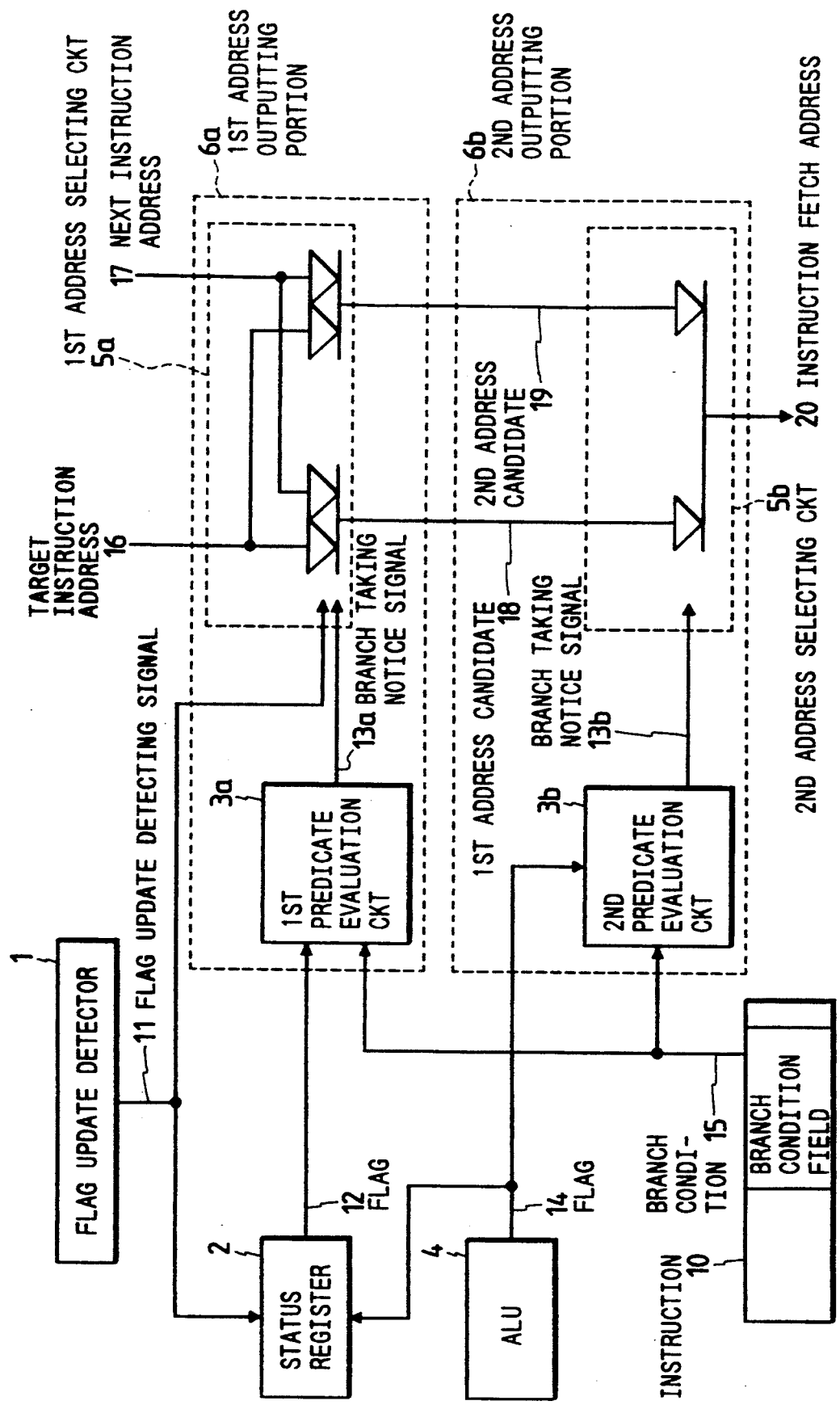
FIG. 1 is a schematic block diagram for showing the construction of a predicate evaluation portion provided in a first embodiment of the present invention for determining whether or not a branch is taken.

Referring first to FIG. 1, there is schematically shown a predicate evaluation portion of a microprocessor which is a first preferred embodiment of the present invention. This predicate evaluation portion is operative to determine whether or not a branch is taken. In this figure, reference numeral 1 indicates a flag update detector which outputs a flag update detecting signal 11. Further, reference numeral 2 indicates a status register in which the word length or size is 32 and among these 32 bits, 4 bits are used for indicating a flag. The status register 2 receives the flag update detecting signal 11 and a flag 14, which is outputted from an ALU 4, as an input thereto and outputs a flag 12 which is stored in the status register 2. Moreover, reference character 3a indicates a first predicate evaluation circuit for receiving signals representing the flag 12 stored in the status register 2 and a branch condition 15 which is content of a branch condition field 10a occupying 4 bits in a fixed-length instruction 10 composed of 32 bits as inputs thereto, determining whether or not the branch condition 15 is met and outputting a signal (i.e. a branch taking notice signal) 13a indicating that the branch condition 15 at the side of the status register flag is met. Furthermore, reference numeral 4 is also an ALU which outputs a flag 14 reflecting the result of the arithmetic operation. Reference numeral 3b indicates a second predicate evaluation circuit for receiving signals representing the flag 14 reflecting the result of the arithmetic operation and the branch condition 15 as inputs thereto, determining whether or not the branch condition 15 is met and outputting a branch taking notice signal 13b indicating that the branch condition 15 at the side of an ALU flag is met. Further, reference numeral 5a indicates a first address selecting circuit for receiving the flag update detecting signal 11, the branch taking notice signal 13a, a target instruction address 16 and a next instruction address 17 as inputs thereto and outputting signals representing a first and second address candidates 18 and 19. Moreover, reference numeral 5b indicates a second address selecting circuit for receiving the branch taking notice signal 13b, the first and second address candidates 18 and 19 and as inputs thereto and outputting a signal representing an instruction address 20 of an instruction to be next executed (hereunder sometimes referred to simply as an instruction fetch address 20). Furthermore, a first address outputting portion 6a comprises the first predicate evaluation circuit 3a and the first address selecting circuit 5a, and a second address outputting portion 6b comprises the second predicate evaluation circuit 3b and the second address selecting circuit 5b.

First, each stage of a microprocessor composed of a four-stage pipeline will be described hereinbelow. The four-stage pipeline consists of an instruction fetch, instruction decode, instruction execution and result storing stages or phases. Incidentally, each of these stages is performed basically each one machine cycle. An operation of each stage or phase will be explained in detail hereinbelow with reference to FIG. 2.

In the instruction fetch stage, a signal representing an instruction address is outputted to a cache memory or an external storage and further the instruction fetch is requested thereof.

Next, in the instruction decode stage, the instruction is first stored in an instruction register and then the stored instruction is decoded and then a control signal is sent to a controlled block. In case of the conditional branch instruction, an instruction address of a target instruction (i.e. an instruction to be executed subsequently to the conditional branch instruction/an delay instruction).

Further, in the instruction execution stage, an arithmetic operation is performed in the ALU to execute the instruction.

Finally, in the result storing stage, the result of the arithmetic operation is written into a register.

As can be understood from the foregoing description, when a conditional branch instruction is executed subsequently to an operation instruction, the instruction fetch address 20 is determined in an instruction execution stage of the operation instruction (more particularly, the instruction decode stage of the conditional branch instruction).

Next, an operation of selecting addresses of the microprocessor of the present invention will be described hereinbelow. The flag update detector 1 determines whether or not the instruction currently executed in the instruction execution stage updates the flag and then informs of the result of the determination by outputting the flag update detecting signal 11. In case where the flag update detector 1 judges that the instruction currently executed in the instruction execution stage does not update the flag, that is, in case where an instruction to be executed immediately prior to the conditional branch instruction does not update the flag like ADD, a value indicated by the branch taking notice signal 13b outputted from the second predicate evaluation circuit 3b is invalid and thus the instruction fetch address 20 can be determined by using only a value indicated by the branch taking notice signal 13a outputted from the second predicate evaluation circuit 3a.

At that time, (1) if the branch taking notice signal 13a outputted from the first predicate evaluation circuit 3a indicates that the branch condition is not met, the next instruction address 17 is outputted as each of the first and second address candidates 18 and 19 in the first address selecting circuit 5a. On the other hand, the second address selecting circuit 5b selects either the first address candidate 18 or the second address candidate 19 outputted by the first address selecting circuit 5a as the instruction fetch address 20 in accordance with the branch taking notice signal 13b outputted from the second predicate evaluation circuit 3b. Further, the second address selecting circuit 5b selects the address candidate 18 when the branch taking notice signal 13b indicates that the branch condition is met, and in contrast with this selects the other address candidate 19 when the branch taking notice signal 13b indicates that the branch condition is not met, and then outputs the selected one of the address candidates 18 and 19 as the instruction fetch address 20. As a result, the next instruction address 17 is outputted as the next executed address 20 regardless of the value indicated by the branch taking notice signal 13b.

(2) When the branch taking notice signal 13a indicates that the branch condition is met, the target instruction address 16 is outputted as each of the first and second address candidates 18 and 19 and further the the second address selecting circuit 5b selects either the first address candidate 18 or the second address candidate 19 outputted by the first address selecting circuit 5a in accordance with the branch taking notice signal 13b outputted from the second predicate evaluation circuit 3b and then outputs the selected candidate 18 or 19 as the instruction fetch address 20. As a result, similarly as in case of (1), the target instruction address 16 is outputted as the instruction fetch acidness 20 regardless of the valise indicated by the branch taking notice signal 13b.

In case where the instruction currently executed in the instruction execution stage in accordance with the flag update detecting signal 11 is judged to be the operation instruction for updating the flag, that is, in case where an instruction to be executed immediately prior to the conditional branch instruction does update the flag like ADDcc, the branch taking notice signal 13a is invalid and further the target instruction address 16 is outputted as the first address candidate 18 and the next instruction address 17 is outputted as the second address candidate 19 without reference to the branch taking notice signal 13a. Then, (3) In case where the branch taking notice signal 13b indicates that the branch condition is not met, the second address selecting circuit 5b selects the second address candidate 19 and then outputs the next instruction address 17 as the instruction fetch address 20. Furthermore, (4) in case where the branch taking notice signal 13b indicates that the branch condition is met, the second address selecting circuit 5b selects the first address candidate 18 and then outputs the target instruction address 16 as the instruction fetch address 20. The above described operation of the address selecting circuit is illustrated in FIG. 3.

As can be seen from FIG. 3, (i) in case where an instruction to be executed immediately prior to the conditional branch instruction is an operation instruction which does not update the flag, the instruction fetch address 20 can be determined only by a value indicated by the branch taking notice signal 13a outputted from the first predicate evaluation circuit 3a.

Figure 8:
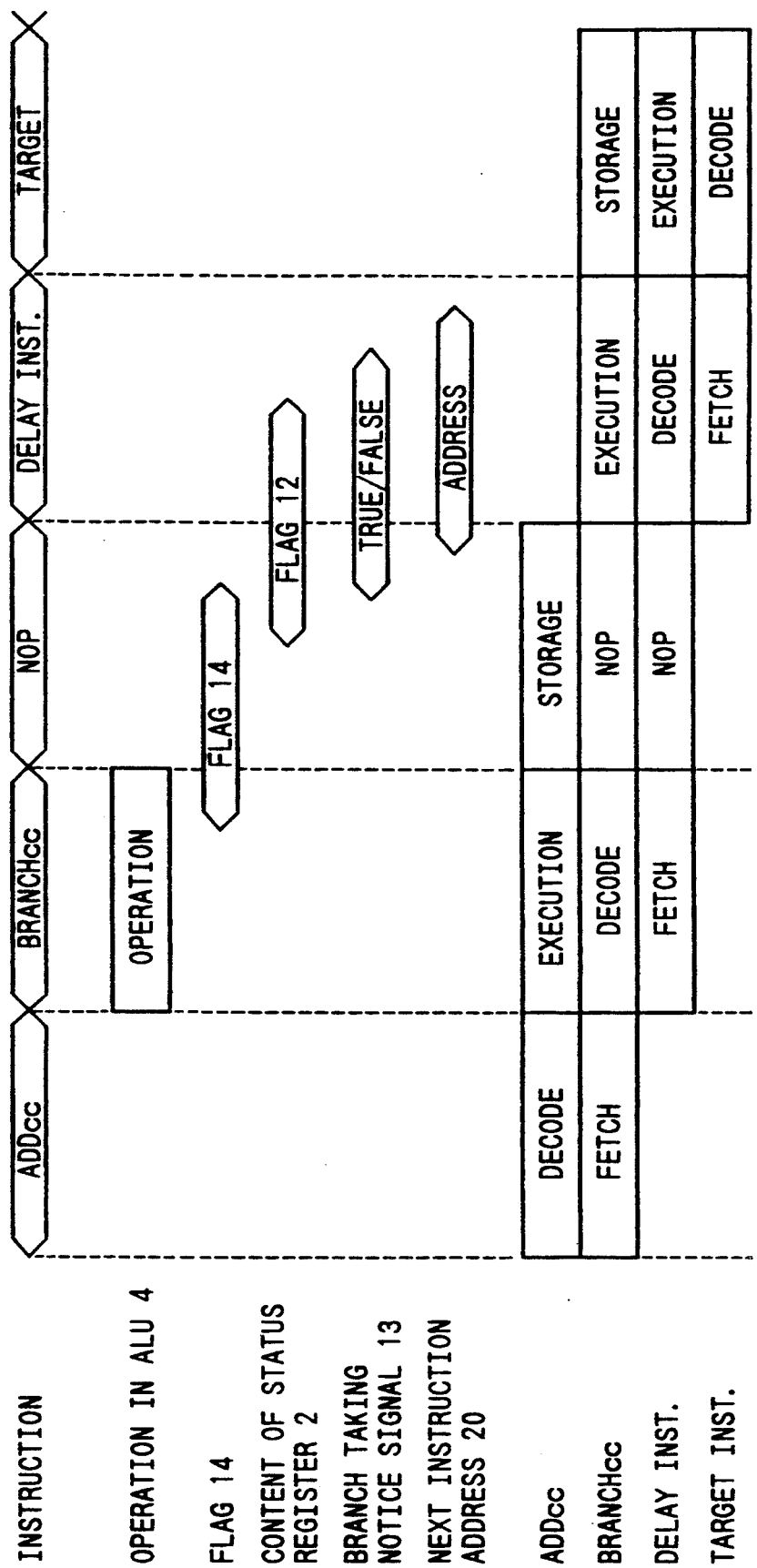
FIG. 8 is a timing chart for showing the relation among the timing of various processing in a conventional microprocessor system when a branch instruction is executed.
Figure 9:
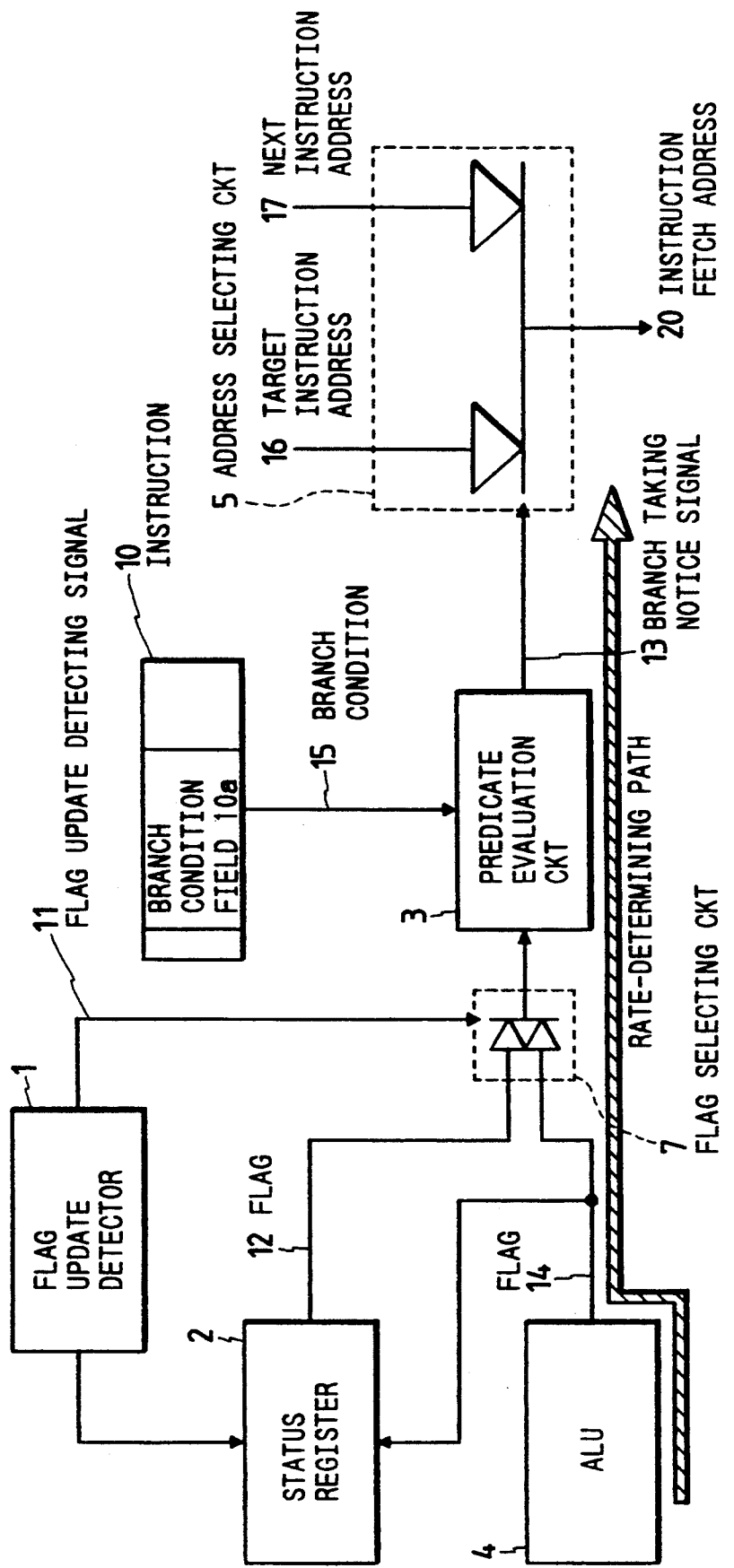
FIG. 9 is a schematic block diagram for shelving the construction of a predicate evaluation portion provided in a conventional microprocessor system for determining whether or not a branch is taken.

(ii) In contrast, in case where an instruction to be executed immediately prior to the conditional branch instruction is an operation instruction which updates the flag, the target instruction address 16 is selected as the first address candidate 18 and on the other hand the next instruction address 17 is selected as the second address candidate 19 and further the instruction fetch address 20 can be determined by a value indicated by the branch taking notice signal 13b outputted from the second predicate evaluation circuit 3b. Namely, the register interlock the time of processing of the conditional branch instruction shown in FIG. 8 can be thus avoided. Further, can be omitted the flag selecting circuit 7 which selects one of the flag 14 outputted from the ALU 4 in the rate-determining path and the flag 12 outputted from the status register 2. Thereby, addresses can be generated at extremely high speed. Moreover, even in case where exception handling addresses, addresses at the time of the reset and so forth other than the target instruction address 16 and the next instruction address 17 are used as the instruction fetch address 20, such exception handling addresses, addresses at the time of the reset and so forth can be inputted into the first address selecting circuit 5a and thus the address selecting logic of the first address selecting circuit 5a becomes complex. This, however, cannot affect the rate of generating the instruction fetch address 20 because the first address selecting circuit 5a is not placed on the rate-determining path.

Figure 4:
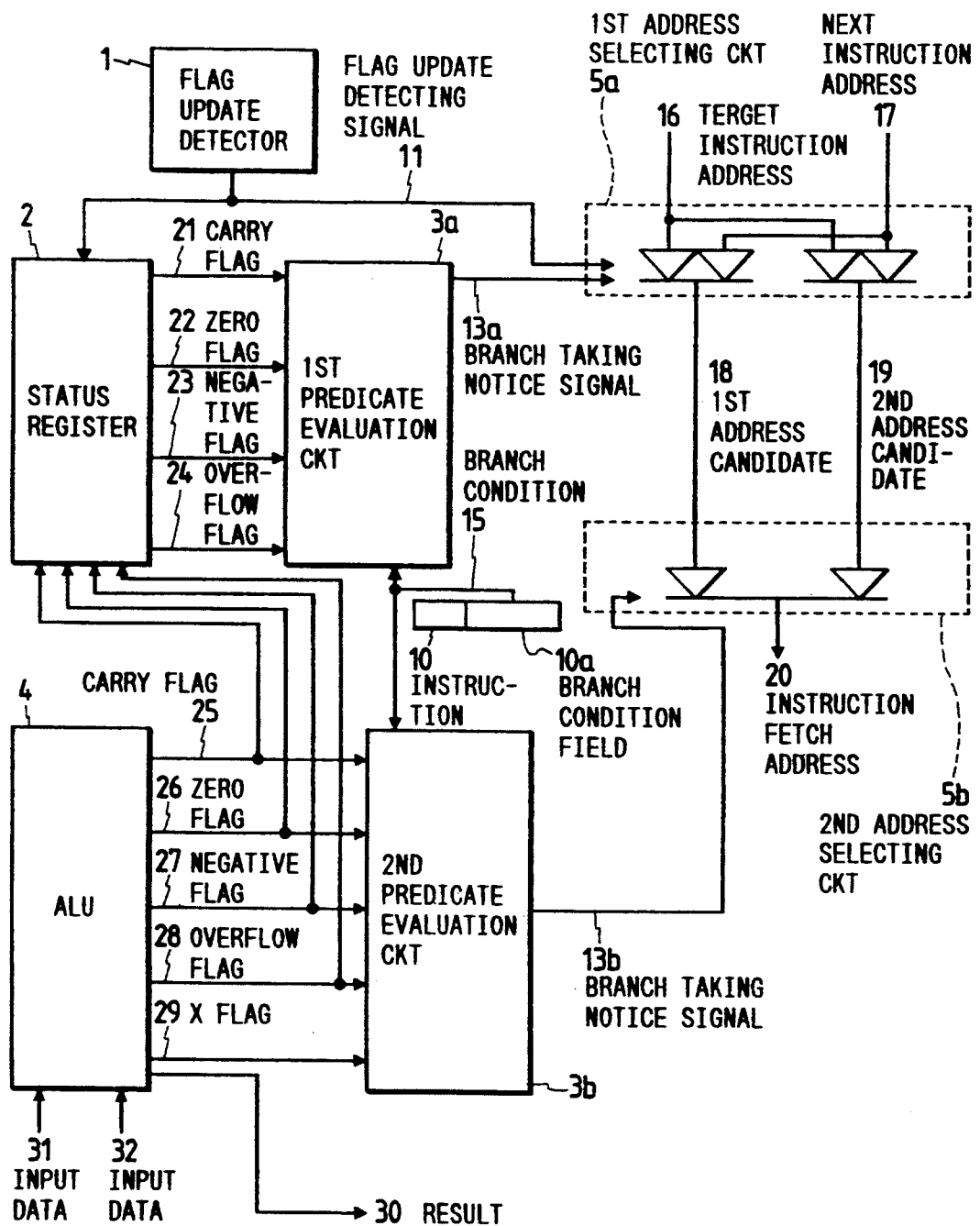
FIG. 4 is a schematic block diagram for showing the construction of a predicate evaluation portion provided in a second embodiment of the present invention for determining whether or not a branch is taken.

Turning now to FIG. 4, there is schematically shown a predicate evaluation portion of another microprocessor which is a second preferred embodiment of the present invention. In this figure, reference numeral 1 denotes a flag update detector which outputs a flag update detecting signal 11. Further, reference numeral 2 denotes a status register in which receives a carry flag 25, a zero flag 26, a negative flag 27, an overflow flag 28 and the Flag update detecting signal 11 as inputs thereto and outputs a carry flag 21, a zero flag 22, a negative flag 23 and an overflow flag 24 which are flags stored in the status register 2. Moreover, reference character 3a denotes a first predicate evaluation circuit which receives signals representing the carry flag 21, the zero flag 22, the negative flag 23, the overflow flag 24 and a branch condition 15 as inputs thereto, and outputs a branch taking notice signal 13a indicating that the branch condition 15 at the side of the status register is met. Furthermore, reference numeral 4 is an ALU which receives input data 31 and 32 and outputs signals indicating the result 30 of the arithmetic operation and the carry flag 25, the zero flag 26, the negative flag 27, the overflow flag 28 and an X flag 29 (logically equivalent to an exclusive-OR of the negative flag 27 and the overflow flag 28), which are flags reflecting the result of the arithmetic operation. Reference numeral 3b denotes a second predicate evaluation circuit for receiving signals representing the carry flag 25, the zero flag 26, the negative flag 27, the overflow flag 28, the X flag 29 and the branch condition 15 as inputs thereto, and outputs a branch taking notice signal 13b indicating that the branch condition 15 at the side of an ALU flag is met. Further, reference numeral 5a indicates a first address selecting circuit for receiving the flag update detecting signal 11, the branch taking notice signal 13a, a target instruction address 16 and a next instruction address 17 as inputs thereto and outputting signals representing a first and second address candidates 18 and 19. Moreover, reference numeral 5b denotes a second address selecting circuit for receiving the branch taking notice signal 13b, the first and second address candidates 18 and 19 and as inputs thereto and outputting a signal representing an instruction fetch address 20.

An address selecting operation of the second embodiment using the flag update detecting signal 11, the branch taking notice signal 13a and 13b is similar to the address selecting operation of the first embodiment as above described. As a flag generation and predicate evaluation means, the ALU 4 outputs signals representing the carry flag 25, the zero flag 26, the negative flag 27, the overflow flag 28 and the X flag 29.

When the arithmetic operation is addition, the X flag 29 is set by the ALU 4, which receives data represented by the most significant bit (MSB) of each of the input data 31 and 32 and other data represented by the MSB of the result 30 of an operation performed on the input data 31 and 32 as inputs thereto, in case where one of the MSB of the input data 31, which is an augend, and that of the input data 32, which is an addend, represents 1 and simultaneously the MSB of the data indicating the result 30 of the operation represents 1, or in case where both of the MSBs of the input data 31 and 32 represent 1 and simultaneously the MSB of the data indicating the result 30 of the operation represents 0.

In contrast, when the arithmetic operation is subtraction, the X flag 29 is set by the ALU 4, in case where one of the MSB of the input data 31, which is a minuend, represents 1 and that of the input data 32, which is a subtracter, represents 0 and simultaneously the MSB of the data indicating the result 30 of the operation represents 1, or in case where the MSB of the input data 31 represents 1 and that of the MSB of the input data 32 represents 0 and simultaneously the MSB of the data indicating the result 30 of the operation represents 0.

The generation of the X flag can be realized by a circuit of which data a represented by the MSB of input data 31 and other data b represented by the MSB of input data 32 and still other data r represented by the MSB of the result 30 of the arithmetic operation performed on the two input data 31 and 32 satisfy one of the following logical expressions:

(a) in case where the arithmetic operation is addition, $$X = (a+b)\cdot r + a\cdot b\cdot r \qquad (1);$$

(b) in case where the arithmetic operation is subtraction, $$X = \overline{(a+b)}\cdot r + a\cdot b\cdot r \qquad (2)$$

where character "X" denotes the value indicated by the X flag; "+" a logical OR operator (i.e. a logical sum operator); "·" a logical product operator; "−" a logical NOT operator; "a" and "b" denote the augend and the addend, respectively, in the case (a); and on the other hand "a" and "b" denote the minuend and the subtracter, respectively, in the case (b). As can be understood from this, the X flag can be generated in a processing time which is as long as a time required for generating of one of the other flags.

FIG. 5 shows the relation between the branch conditions and the expressions corresponding to the branch conditions in terms of the four flags. In this table, character "C" denotes the carry flag; "Z" the zero flag; "N" the negative flag; "V" the overflow flag; "X" the X flag; "xor" an exclusive-OR operator; "or" a logical OR operator; and "not" an logical NOT operator.

The second predicate evaluation circuit 3b receives the carry flag 25, the zero flag 26, the negative flag 27, the overflow flag 28 and the X flag 29 as inputs thereto and further outputs the branch taking notice signal 13b. By generating this X flag by using the ALU 4 in parallel with the generation of the other flags, logical processing of calculating the exclusive-OR of the negative flag and the overflow flag can be removed from the processing to be performed in a rate-determining path of the second predicate evaluation circuit 3b in case that the branch conditions, which are rate-determining events, are "greater", "less or equal", "greater or equal" or "less", whereby the branch taking notice signal 13b can be generate at a high speed.

Figure 6:
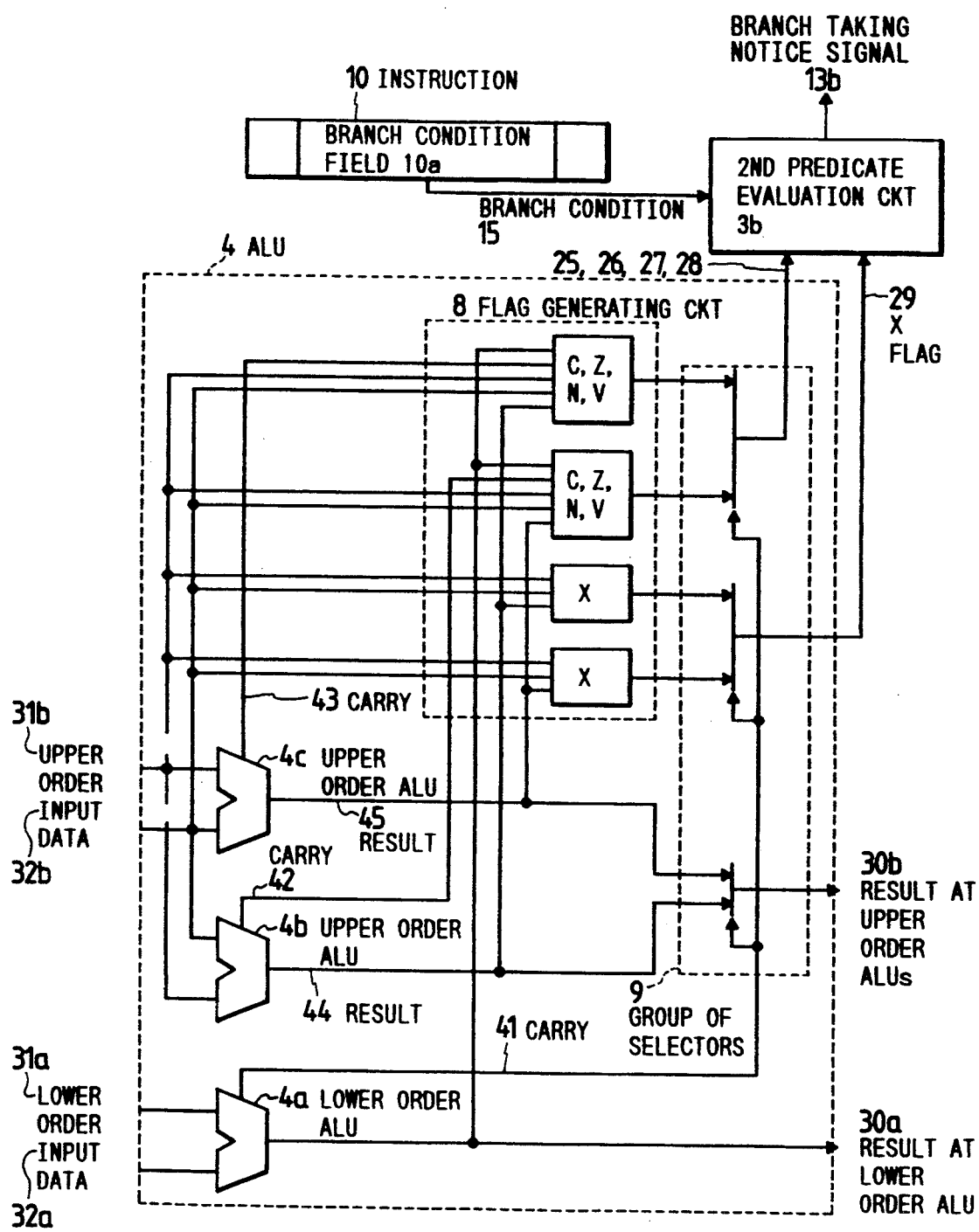
FIG. 6 is a schematic block diagram for showing the construction of a flag generating means of an arithmetic logical unit of a predicate evaluation portion provided in the second embodiment of the present invention.
Figure 7:
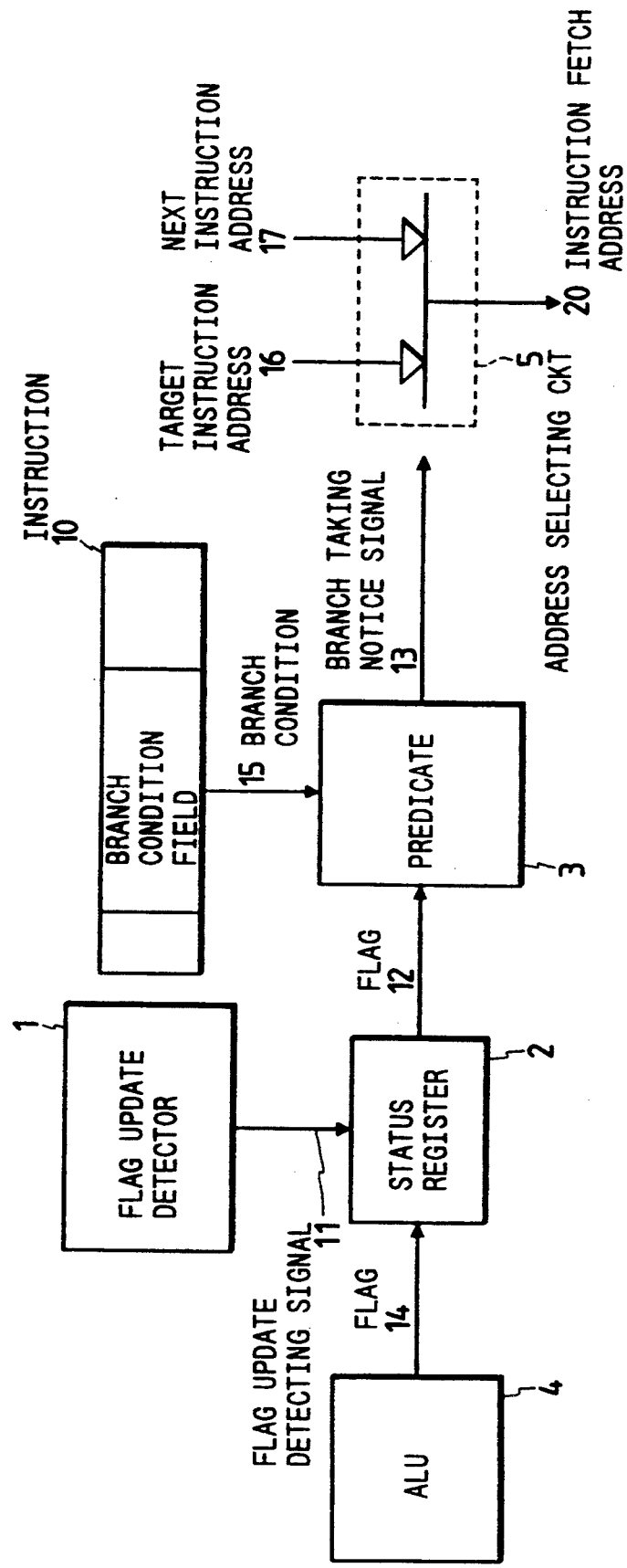
FIG. 7 is a schematic block diagram for showing the construction of a part, which is used For generating an instruction address when a branch instruction is executed, of a branch instruction processing portion of a conventional system.

FIG. 6 is a schematic block diagram for showing the flag generating means of the ALU of the microprocessor system which is the second embodiment of the present invention. In this figure, reference numeral 4a denotes a lower order ALU which is composed of a 28-bit 2-stage carry look ahead (CLA) circuit and to which lower order input data 31a and 32a are inputted and from which lower order result 30a of an arithmetic operation and a carry 41 therefrom are outputted. Further, reference numeral 4b denotes a 4-bit upper order ALU which receives upper order input data 31b and 32b as inputs thereto and performs an arithmetic operation by assuming that a carry from the lower order ALU is 0 and then outputs the result 44 of the arithmetic operation and a carry 42. Moreover, reference numeral 4c denotes another 4-bit upper order ALU which receives upper order input data 31b and 32b as inputs thereto and performs an arithmetic operation by assuming that a carry from the lower order ALU is 1 and then outputs the result 45 of the arithmetic operation and a carry 43. Furthermore, reference numeral 8 denotes a flag generating circuit which receives data represented by the MSB of the upper order input data 31b, data represented by the MSB of the upper order input data 32b, the output 44 of the upper order ALU 4b, the output 45 of the upper order ALU 4c, the result 30a of the arithmetic operation performed in the lower order ALU 4a, the carry 42 from the upper order ALU 4b and the carry 43 from the upper order ALU 4c as inputs thereto and then outputs the respective flags C, Z, N and V and the respective X flags corresponding to a pair of the upper order ALUs 4b and 4c. Reference numeral 9 indicates a group of selectors which receive the carry 41 from the lower order ALU 4a and selects the flags outputted from the flag generating circuit 8 reflecting the results of the arithmetic operation performed in the upper order ALU 4b and 4c in accordance with the value of the carry 41 and then outputs the flags C, Z, N, V and X (namely, the carry flag 25, the zero flag 26, the negative flag 27, the overflow flag 28 and the X flag 29). Reference numeral 3b indicates the second predicate evaluation circuit which receives the flags C, Z, N, V and X (namely, the carry flag 25, the zero flag 26, the negative flag 27, the overflow flag 28 and the X flag 29) outputted from the group 9 of selectors and the branch condition 15 as inputs thereto and then outputs the branch taking notice signal 13b. This group 9 of the selectors further receives the results 44 and 45 (hereunder sometimes referred to simply as upper order results) of the arithmetic operations respectively performed in the upper order ALUs 4b and 4c and respectively corresponding to the upper order input data 31b and 32b as inputs thereto and thereafter outputs upper order result 30b of the arithmetic operation. Further, the flag generating circuit 8 generates the five flags reflecting the upper order result 44 and those reflecting the upper order result 45, respectively.

Incidentally, the logical expressions used for generating the X flag are the same as above described. That is, (a) in case where the arithmetic operation is addition, $$X = (a+b) \cdot r + a \cdot b \cdot \overline{r} \quad (1);$$

(b) in case where the arithmetic operation is subtraction, $$X = (\overline{a+b}) \cdot r + a \cdot b \cdot \overline{r} \quad (2).$$

Further, the X flags respectively corresponding to the output 44 of the upper order ALU 4b and the output 45 of the upper order ALU 4c are generated by respectively using data r represented by the MSB of the output 44 and other data r represented by the MSB of the output 45 and are outputted to the group 9 of the selectors. Then, the group 9 of the selectors select a group of the five flags C, Z, N, V and X from the pair of the groups thereof in accordance with the carry 41 from the lower order ALU 4a and output the selected group of the five flags. More particularly, the group 9 of the selectors choose the flags reflecting the output of the upper order ALU 4b when the carry 41 from the lower order ALU 4a is 0 and also choose the flags reflecting the output of the upper order ALU 4c when the carry 41 is 1 and then outputs the chosen flags as the carry flag 25, the zero flag 28, the negative flag 27, the overflow flag 28 and the X flag 29. Thereafter, the five flags outputted from the group 9 of the selectors are inputted to the predicate evaluation circuit 3b whereupon it is determined whether or not the branch condition is met. Further, the predicate evaluation circuit 3b outputs the branch taking notice signal 13b indicating the result of the determination. Thereby, the carry flag 25, the zero flag 28, the negative flag 27, the overflow flag 28 and the X flag 29 can be generated at a high speed.

While preferred embodiments of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A microprocessor system comprising:
an arithmetic logic unit for generating flats;
a flag update detector for outputting a flag update detecting signal;
a status register coupled to said flag update detector and said arithmetic logic unit for receiving the flag update detecting signal and a flag outputted from said arithmetic logic unit;
a first address outputting portion coupled to said flag update detector and said status register for receiving the flag update detecting signal, a flag outputted from said status register, a target instruction address, a next instruction address and a branch condition of a conditional branch instruction, for determining according to the flag received from said status register whether or not the branch condition is met, and for outputting first and second address candidates selected from the target instruction address and the next instruction address according to the flag update signal and to whether or not the branch condition is met; and a second address outputting portion coupled to said first address outputting portion and said arithmetic logic unit for receiving the first and second address candidates outputted from said first address outputting portion, the branch condition of the conditional branch instruction and the flag outputted from said arithmetic logic unit, for determining according to the flag received from said arithmetic logic unit whether or not the branch condition is met, and for outputting the target instruction address or the next instruction address as an instruction fetch address on the basis of a result of determining according to the flag received from said arithmetic logic unit whether or not the branch condition is met.

2. A microprocessor system as set forth in claim 1, wherein said first address outputting portion comprises:
a first predicate evaluation circuit for receiving the flag outputted from said status register; and
a first address selecting circuit for receiving the target instruction address and the next instruction address and outputting a first and second address candidates in accordance with a branch taking notice signal outputted from said first predicate evaluation circuit and a flag update detecting signal outputted from a flag update detector.

3. A microprocessor system as set forth in claim 2, wherein said second address outputting portion comprises:
a second predicate evaluation circuit for receiving the flag outputted from said arithmetic logical unit; and
a second address selecting circuit for receiving the first and second address candidates outputted from said first address selecting circuit and outputting the target instruction address and the next instruction address as an instruction fetch address in accordance with a branch taking notice signal outputted from said second predicate evaluation circuit.

4. A microprocessor system as set forth in claim 2, wherein the target instruction address is outputted as the first address candidate and on the other hand the next instruction address is outputted as the second address candidate in case where the flag update detecting signal outputted from said flag update detector to said first address outputting portion is asserted, wherein the target instruction address is outputted as the first and second address candidates in case where the flag update detecting signal is negated and the branch taking notice signal indicates that a branch is taken, and wherein the next instruction address is outputted as the first and second address candidates in case where the flag update detecting signal is negated and the branch taking notice signal indicates that a branch is not taken.

5. A microprocessor system as set forth in claim 3, wherein a flag generating means of said arithmetic logical unit generates a carry flag, a zero flag, a negative flag, an overflow flag and a flag, which has a logical value equal to an exclusive-OR of the negative and overflow flags by using values represented by the most significant bits of two input data of said arithmetic logical unit and a value indicated by the most significant bit of the result of an arithmetic operation performed by said arithmetic logical unit, in parallel with each other and inputs the carry flag, the zero flag, the negative flag, the overflow flag and the flag having the logical value equal to the exclusive-OR of the negative and overflow flags into said second predicate evaluation circuit.

6. A microprocessor system as set forth in claim 1, wherein a flag generating means of said arithmetic logical unit, which is of a carry selecting type having a lower order arithmetic logical unit and a pair of a first and second upper order arithmetic logical units, comprises:
a flag generating circuit for generating from an output of each of said first and second upper order arithmetic logical units a carry flag, a zero flag, a negative flag, an overflow flag and a flag, which has a logical value equal to an exclusive-OR of the negative and overflow flags, by using a value indicated by the most significant bit of the two input data to said arithmetic logical unit and values indicated by the most significant bits of the results of the arithmetic operations performed in said first and second upper order arithmetic units, and for outputting the carry flag, the zero flag, the negative flag, the overflow flag and the flag having the logical value equal to the exclusive-OR of the negative and overflow flags corresponding to each of said pair of said first and second upper order arithmetic logical units; and
a group of selectors for receiving the pair of groups of the carry flags, the zero flags, the negative flags, the overflow flags and the flags each having the logical value equal to the exclusive-OR of the negative and overflow flags outputted from said flag generating circuit and a carry outputted from said lower order arithmetic unit, choosing one of the pair of groups of the carry flags, the zero flags, the negative flags, the overflow flags and the flags each having the logical value equal to the exclusive-OR of the negative and overflow flags outputted from said flag generating circuit and outputting the chosen carry flag, zero flag, negative flag, overflow flag and the flag having the logical value equal to the exclusive-OR of the negative and overflow flags to said predicate evaluation circuit.

7. A microprocessor system as set forth in claim 5, wherein the generation of the flag having the logical value X equal to the exclusive-OR of the negative and overflow flows is performed by using a first value a represented by the most significant bit of one of the two input data to said arithmetic logical unit and a second value b represented by the most significant bit of the other input data to said arithmetic logical unit and a third value r represented by the most significant bit of the result of the arithmetic operation performed on the two input data which satisfy one of the following logical expressions:

(a) in case where the arithmetic operation is addition, $$X = (a+b) \cdot r + a \cdot b \cdot r$$

(b) in case where the arithmetic operation is subtraction, $$X = (a+b) \cdot r + a \cdot b \cdot r.$$

8. A microprocessor system as set forth in claim 6, wherein the generation of the flag having the logical value X equal to the exclusive-OR of the negative and overflow flags is performed in said flag generating circuit by using a first value a represented by the most significant bit of one of the two input data to each of said upper order arithmetic logical units and a second value b represented by the most significant bit of the other input data to each of said upper order arithmetic logical units and a third value r represented by the most significant bit of the result of the arithmetic operation performed on the two input data which satisfy one of the following logical expressions:

(a) in case where the arithmetic operation is addition, $$X = (a+b) \cdot r + a \cdot b \cdot r$$

(b) in case where the arithmetic operation is subtraction, $$X = (a+b) \cdot r + a \cdot b \cdot r.$$

* * * * *